United States Patent
Wade et al.

(10) Patent No.: US 8,860,828 B2
(45) Date of Patent: Oct. 14, 2014

(54) OPTICAL UNIT WITH SHAKE CORRECTING FUNCTION

(75) Inventors: Tatsuki Wade, Nagano (JP); Shinroku Asakawa, Nagano (JP); Shinji Minamisawa, Nagano (JP); Katsushige Yanagisawa, Nagano (JP); Yoshihiro Hamada, Nagano (JP)

(73) Assignee: Nidec Sankyo Corporation (JP)

( * ) Notice: Subject to any disclaimer, the term of this patent is extended or adjusted under 35 U.S.C. 154(b) by 18 days.

(21) Appl. No.: 13/702,487

(22) PCT Filed: May 24, 2011

(86) PCT No.: PCT/JP2011/061816
§ 371 (c)(1),
(2), (4) Date: Dec. 6, 2012

(87) PCT Pub. No.: WO2011/155316
PCT Pub. Date: Dec. 15, 2011

(65) Prior Publication Data
US 2013/0215284 A1    Aug. 22, 2013

(30) Foreign Application Priority Data
Jun. 8, 2010   (JP) .................................. 2010-131388

(51) Int. Cl.
*H04N 5/225* (2006.01)
*G02B 27/64* (2006.01)
*H04N 5/232* (2006.01)
*G03B 5/00* (2006.01)

(52) U.S. Cl.
CPC ............... *H04N 5/2328* (2013.01); *G03B 5/00* (2013.01); *H04N 5/23287* (2013.01); *G03B 2205/0069* (2013.01); *G03B 2205/0023* (2013.01)

USPC ...................... 348/208.7; 348/208.4; 348/340

(58) Field of Classification Search
USPC .......................... 348/294, 335, 340, 373, 374
See application file for complete search history.

(56) References Cited

U.S. PATENT DOCUMENTS

2010/0091120 A1* 4/2010 Nagata et al. ............... 348/208.4
2010/0098394 A1* 4/2010 Ishihara et al. ................. 396/55
(Continued)

FOREIGN PATENT DOCUMENTS

| JP | 2002-262545 A | 9/2002 |
| JP | 2005-215454 A | 8/2005 |

(Continued)

OTHER PUBLICATIONS

International Search Report for International application No. PCT/JP2011/061816 mailing date of Aug. 16, 2011 with English Translation.

*Primary Examiner* — Twyler Haskins
*Assistant Examiner* — Dwight C Tejano
(74) *Attorney, Agent, or Firm* — Cantor Colburn LLP

(57) ABSTRACT

An optical unit may include a fixed body; a movable module which holds an optical element; and a shake correction drive mechanism which is structured to generate a drive force for swinging the movable module with respect to the fixed body. The shake correction drive mechanism may include a plurality of permanent magnets which are provided on an outer peripheral face of the movable module at positions separated in a circumferential direction around an optical axis of the optical element; and a sheet-shaped coil which is extended in a circumferential direction in the fixed body and is integrally provided with a plurality of coil parts facing the permanent magnets and a terminal part electrically connected with the coil parts.

13 Claims, 11 Drawing Sheets

(56) References Cited

U.S. PATENT DOCUMENTS

| | | | |
|---|---|---|---|
| 2011/0001836 A1* | 1/2011 | Chiang | 348/208.99 |
| 2011/0103782 A1* | 5/2011 | Tsuruta et al. | 396/55 |
| 2011/0122267 A1* | 5/2011 | Ahn et al. | 348/208.7 |
| 2011/0141342 A1* | 6/2011 | Ming et al. | 348/345 |
| 2011/0262121 A1* | 10/2011 | Yanagisawa et al. | 396/55 |
| 2013/0136437 A1* | 5/2013 | Asakawa et al. | 396/55 |
| 2013/0163974 A1* | 6/2013 | Takei et al. | 396/55 |

FOREIGN PATENT DOCUMENTS

| | | |
|---|---|---|
| JP | 2007-109317 A | 4/2007 |
| JP | 2009-288769 A | 12/2009 |
| JP | 2010-117708 A | 5/2010 |
| WO | 2009/139543 A1 | 11/2009 |
| WO | 2010/044195 A1 | 4/2010 |
| WO | 2010/044196 A1 | 4/2010 |
| WO | 2010/044197 A1 | 4/2010 |

* cited by examiner

OPTICAL UNIT WITH SHAKE CORRECTING FUNCTION

CROSS REFERENCE TO RELATED APPLICATIONS

This is a U.S. national stage of International Application No. PCT/JP2011/061816, filed on May 24, 2011. Priority under 35 U.S.C. §119(a) and 35 U.S.C. §365(b) is claimed from Japanese Application No. 2010-131388, filed Jun. 8, 2010, the disclosures of which are also incorporated herein by reference.

TECHNICAL FIELD

The present invention relates to an optical unit with a shake correcting function which is mounted on a cell phone with a camera or the like.

BACKGROUND

In recent years, an optical device such as a cell phone is structured on which an optical unit for photographing is mounted. The optical unit for photographing includes a photographing unit on which a movable body having a lens, a lens drive mechanism for focusing which magnetically drives the movable body in an optical axis direction, and an imaging element are supported on a support body. In the optical unit, in order to restrain or reduce any disturbance of a photographed image due to a shake in the hand of a user, a technique has been proposed in which the photographing unit is structured as the movable module which is capable of swinging on a fixed body and, in which a shake correction drive mechanism is structured which uses permanent magnets and discrete air-core coils between the photographing unit (movable module) and the fixed body (see Patent Literature 1).
[PTL 1] Japanese Patent Laid-Open No. 2009-288769

However, in order to correct a hand shake in every direction in the optical unit, the air-core coils are required to be disposed at plural positions separated from each other in a circumferential direction of the photographing unit and each of a plurality of the air-core coils is required to be electrically connected. Therefore, like the structure described in Patent Literature 1, when the permanent magnets and the discrete air-core coils are disposed between the fixed body and the photographing unit, a number of man-hours is required for arranging and electrically connecting the air-core coils.

The above-mentioned problem is not limited to a case that a shake in the hand is corrected in an optical unit for photographing and is common to a general case that a shake is corrected in an optical unit.

SUMMARY

In view of the problem described above, at least an embodiment of the present invention provides an optical unit with a shake correcting function in which, even when a shake correction drive mechanism is provided between the movable module and the fixed body, increase of assembly man-hours is restricted to a minimum.

In order to attain the above, at least an embodiment of the present invention provides an optical unit with a shake correcting function including a fixed body, a movable module which holds an optical element, and a shake correction drive mechanism which is structured to generate a drive force for swinging the movable module with respect to the fixed body. The shake correction drive mechanism includes a plurality of permanent magnets which are provided on an outer peripheral face of the movable module at positions separated in a circumferential direction around an optical axis of the optical element, and a sheet-shaped coil which is extended in a circumferential direction in the fixed body and is integrally provided with a plurality of coil parts facing the permanent magnets and a terminal part electrically connected with the coil parts.

In the optical unit with a shake correcting function (optical unit) in accordance with at least an embodiment of the present invention, permanent magnets are provided on an outer peripheral face of the movable module at plural positions separated in a circumferential direction around the optical axis, and a sheet-shaped coil which is extended in a circumferential direction and is provided with a plurality of coil parts facing the permanent magnets is provided in the fixed body. Therefore, in a case that a shake such as a hand shake occurs in the optical unit, when electrical power is supplied to the coil parts of the sheet-shaped coil, the movable module is swung. Accordingly, even when the optical unit is shaken, the inclination of the optical axis can be corrected. In order to structure the shake correction drive mechanism, a sheet-shaped coil is used in at least an embodiment of the present invention and, when the sheet-shaped coil is used, a plurality of the coil parts and the terminal part are integrally provided with each other. As a result, even when a coil part is disposed at plural positions around the optical axis, it is sufficient that the sheet-shaped coil is extended around the optical axis. Accordingly, different from a case that a discrete air-core coil is used, the coil parts are not required to separately dispose at plural positions around the optical axis and to be electrically connected and thus, assembly man-hours can be reduced.

In at least an embodiment of the present invention, it may be structured that the coil part is structured of a plurality of wiring line layers which are stacked through an insulation film on a circuit board. According to this structure, in comparison with a case that an air-core coil is used, a distance between the movable module and the fixed body can be narrowed. Therefore, the size of the optical unit is reduced.

In at least an embodiment of the present invention, it may be structured that the sheet-shaped coil includes a circuit board which is oppositely disposed to the permanent magnet, and a plurality of air-core coils which are fixed to a face of the circuit board opposite to a side facing the permanent magnet to structure the coil parts.

In at least an embodiment of the present invention, it is preferable that the terminal part is disposed on an outer face of the sheet-shaped coil which is a side opposite to a side facing the permanent magnet. According to this structure, electrical connection with the coil parts can be performed easily.

In at least an embodiment of the present invention, it may be structured that a movable range of the movable module in a direction intersecting the optical axis is restricted by abutting of the sheet-shaped coil with the permanent magnet. In a case of a sheet-shaped coil, different from an air-core coil, a wound coil is not loosened even when the coil is abutted with the permanent magnet. Therefore, abutting of the sheet-shaped coil with the permanent magnet is utilized to restrict a movable range of the movable module.

In at least an embodiment of the present invention, it is preferable that a resin layer is formed on a face of the permanent magnet facing the sheet-shaped coil. According to this structure, when the sheet-shaped coil and the permanent magnet are abutted with each other to restrict the movable range of the movable module, the sheet-shaped coil and the permanent magnet are surely prevented from being damaged.

In at least an embodiment of the present invention, it is preferable that a distance between the permanent magnet and the sheet-shaped coil is widened as separated in a direction of the optical axis from a swing center of the movable module. According to this structure, the permanent magnet and the sheet-shaped coil are faced each other in parallel on the side to which the movable module is inclined and thus an average distance between the permanent magnet and the coil part becomes narrow. Therefore, in the shake correction drive mechanism, a force for swinging the movable module is generated efficiently. Further, in a case that the permanent magnet and the sheet-shaped coil are abutted with each other, it is avoided that a corner portion of the permanent magnet is strongly abutted with the sheet-shaped coil. Therefore, the sheet-shaped coil and the permanent magnet are surely prevented from being damaged.

In at least an embodiment of the present invention, it is preferable that the coil part is disposed within a first region where directions of magnetic lines of force generated from the permanent magnet are directions substantially going away from the swing center of the movable module, and/or the coil part is disposed within a second region where directions of the magnetic lines of force generated from the permanent magnet are directions substantially going toward the swing center. According to this structure, a direction of an electro-magnetic force generated by supplying an electric current to the coil part is substantially coincided with a tangential direction of a circle whose center is a swing support point and which passes the coil part. In other words, the direction of the electro-magnetic force generated by supplying an electric current to the coil part is substantially coincided with the direction generating a swing force for swinging the movable module with the swing support point as a swing center. Therefore, a drive force of the shake correction drive mechanism is enhanced by effectively utilizing the magnetic flux generated from the permanent magnet.

In at least an embodiment of the present invention, it may be structured that the movable module holds an imaging element and a lens as the optical element.

In the optical unit with a shake correcting function in accordance with at least an embodiment of the present invention, a permanent magnet is provided on an outer peripheral face of the movable module at plural positions separated in a circumferential direction around the optical axis, and a sheet-shaped coil which is extended in the circumferential direction and is provided with a plurality of coil parts facing the permanent magnet is provided in the fixed body. Therefore, in a case that a shake such as a hand shake occurs in the optical unit, when electrical power is supplied to the coil parts of the sheet-shaped coil, the movable module is swung. Accordingly, even when the optical unit is shaken, the inclination of the optical axis can be corrected. In order to structure the shake correction drive mechanism, a sheet-shaped coil is used in at least an embodiment of the present invention and thus, in comparison with a case that a discrete air-core coil is used, a distance between the movable module and the fixed body can be narrowed and the size of the optical unit can be made small. Further, in a case of a sheet-shaped coil, a plurality of the coil parts and the terminal part are integrally provided with each other and thus, even when a coil part is disposed at plural positions around the optical axis, it is sufficient that the sheet-shaped coil is extended around the optical axis. Therefore, different from a case that an air-core coil is separately used, the coil parts are not required to dispose at plural positions around the optical axis and to be electrically connected and thus, assembly man-hours can be reduced. Accordingly, even when the shake correction drive mechanism is provided between the movable module and the fixed body, increase of the size and the assembly man-hours can be restrained to a minimum.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings. In the following description, a structure for preventing a hand shake in a photographing unit will be described as an example for an optical element unit. Further, in the following description, three directions perpendicular to each other are set to be an "X"-axis, a "Y"-axis and a "Z"-axis and a direction along an optical axis "L" (lens optical axis) is set to be the "Z"-axis. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side of the "X"-axis, "−X" is indicated on the other side, "+Y" is indicated on one side of the "Y"-axis, "−Y" is indicated on the other side, "+Z" is indicated on one side (opposite side to an object side) of the "Z"-axis, and "−Z" is indicated on the other side (object side).

(Entire Structure of Optical Unit for Photographing)

Figure 1:
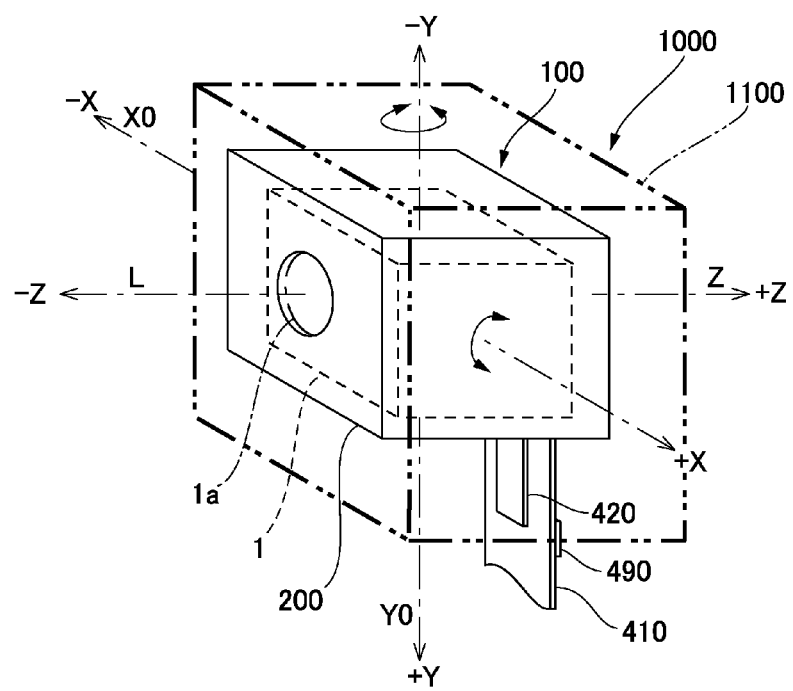
FIG. 1 is an explanatory view schematically showing a state in which an optical unit with a shake correcting function to which at least an embodiment of the present invention is applied is mounted on an optical device such as a cell phone.
Figure 2A:
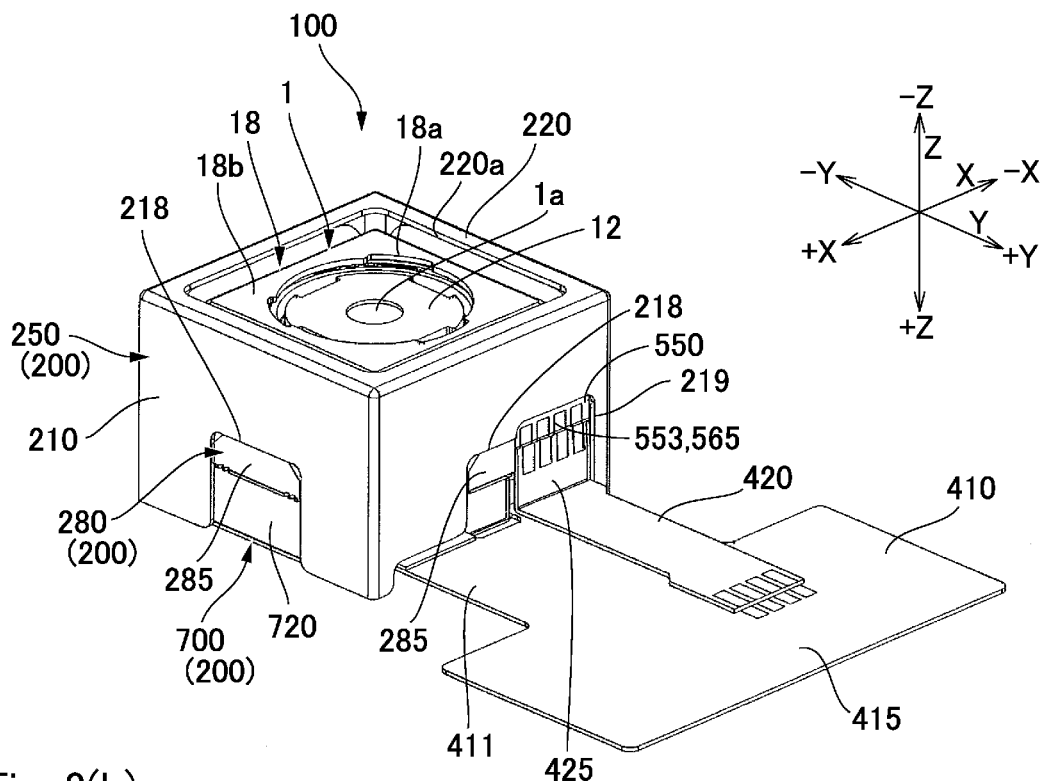
FIGS. 2(a) and 2(b) are perspective views showing an outward appearance of an optical unit with a shake correcting function and the like to which at least an embodiment of the present invention is applied.
Figure 2B:
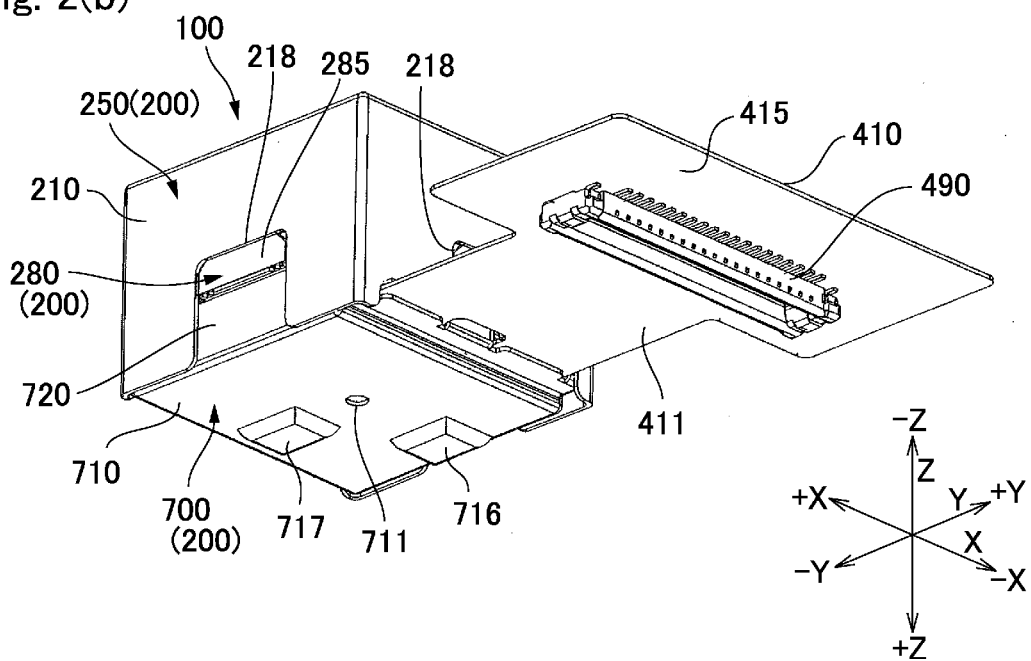

FIG. 1 is an explanatory view schematically showing a state in which an optical unit with a shake correcting function to which at least an embodiment of the present invention is applied is mounted on an optical device such as a cell phone. FIGS. 2(*a*) and 2(*b*) are perspective views showing an outward appearance of an optical unit with a shake correcting function and the like to which at least an embodiment of the present invention is applied. FIG. 2(*a*) is a perspective view showing the optical unit which is viewed from an object side and FIG. 2(*b*) is a perspective view showing the optical unit which is viewed from an opposite side to the object side.

An optical unit 100 (optical unit with a shake correcting function) shown in FIG. 1 is a thin camera used in an optical device 1000 such as a cell phone with a camera and is mounted in a supported state by a chassis 1100 (device main body) of the optical device 1000. In the optical unit 100, when a shake such as a hand shake is occurred in the optical device 1000 at the time of photographing, disturbance occurs in a photographed image. Therefore, in the optical unit 100 in this embodiment, as described below, a movable body including a photographing unit 1 is supported within a fixed body 200 so as to be capable of being swung and the optical unit 100 is provided with a shake correction drive mechanism (not shown in FIG. 1) which swings the photographing unit 1 on the basis of a detection result for a hand shake by a gyroscope (not shown) mounted on the optical unit 100 or a gyroscope (not shown) mounted on a main body side of the optical device 1000.

As shown in FIG. 1 and FIGS. 2(*a*) and 2(*b*), flexible circuit boards 410 and 420 are extended out from the optical unit 100 for supplying power to the photographing unit 1 and the shake correction drive mechanism. The flexible circuit boards 410 and 420 are electrically connected with a host control section or the like which is provided in a main body of the optical device 1000 through a common connector 490 or the like. Further, the flexible circuit board 410 is also provided with a function for outputting a signal from the photographing unit 1. Therefore, the number of wiring lines in the flexible circuit board 410 is large and thus a relatively wide flexible circuit board 410 is used.

(Structure of Photographing Unit 1)

Figure 3:
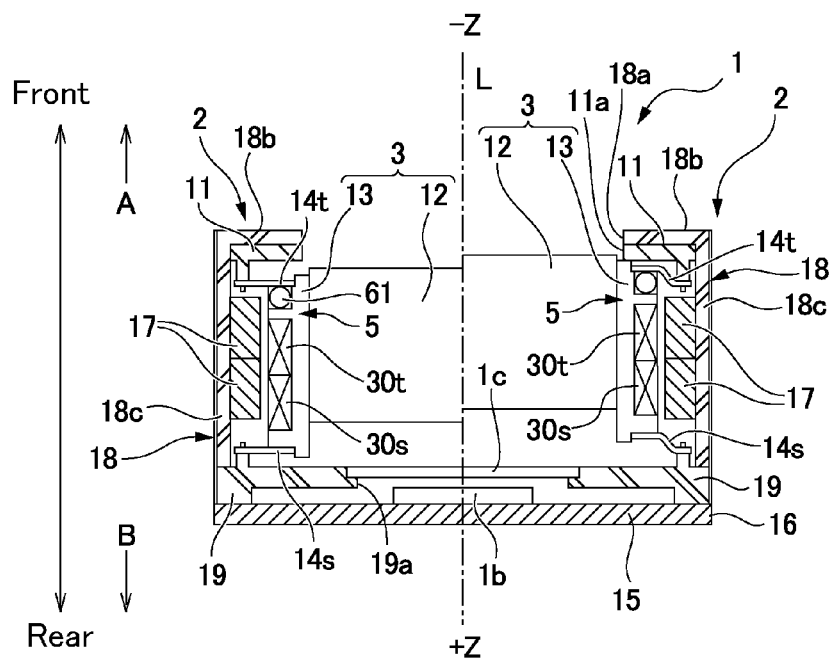
FIG. 3 is a cross-sectional view schematically showing a structure of a photographing unit 1 which is mounted on an optical unit with a shake correcting function to which at least an embodiment of the present invention is applied.
Figure 4:
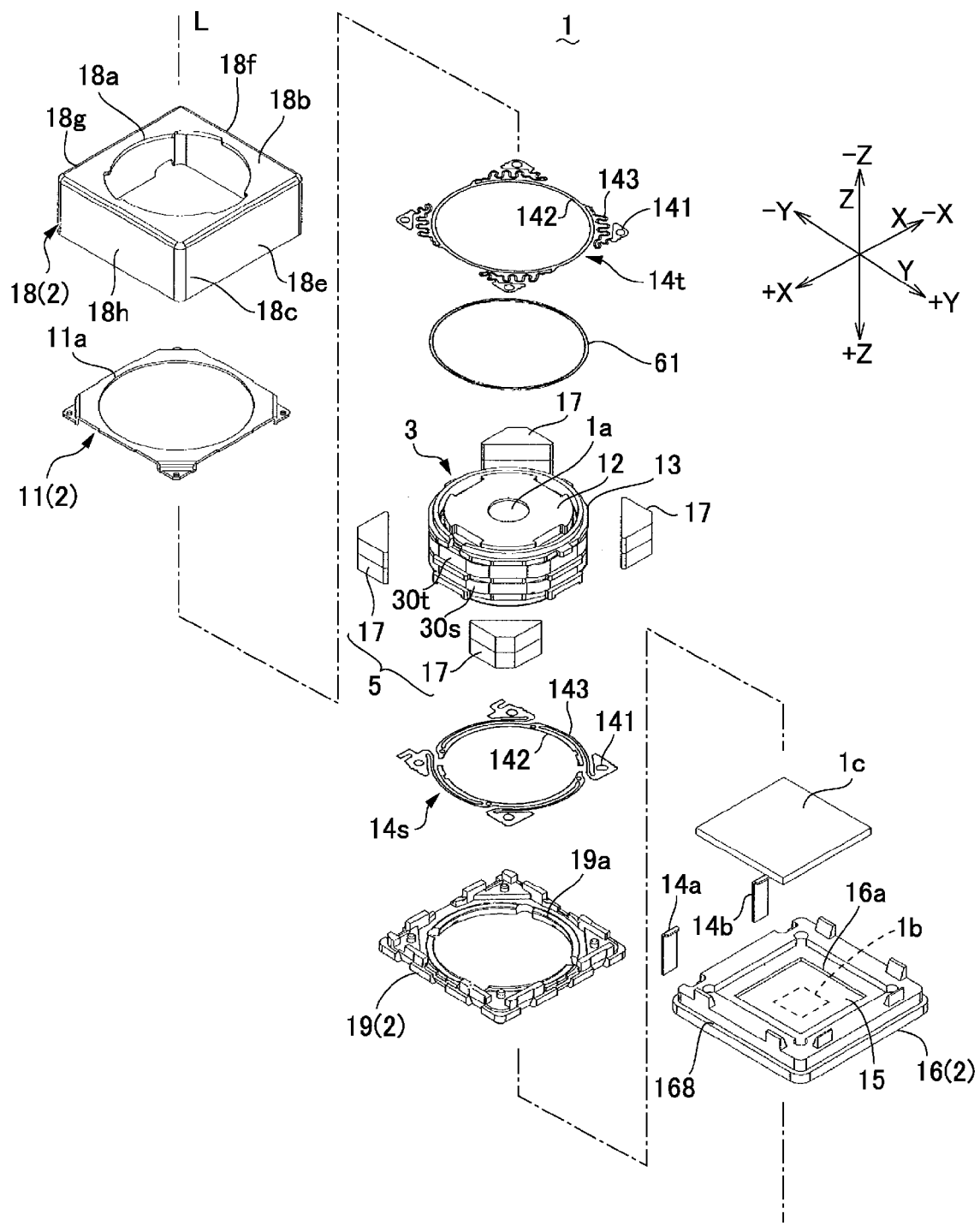
FIG. 4 is an exploded perspective view showing a photographing unit which is mounted on an optical unit with a shake correcting function to which at least an embodiment of the present invention is applied.

FIG. 3 is a cross-sectional view schematically showing a structure of the photographing unit 1 which is mounted on the optical unit 100 with a shake correcting function to which at least an embodiment of the present invention is applied. FIG. 4 is an exploded perspective view showing the photographing unit 1 which is mounted on the optical unit 100 with a shake correcting function to which at least an embodiment of the present invention is applied.

As shown in FIGS. 3 and 4, the photographing unit 1 is, for example, an optical element unit which moves a plurality of lenses 1*a* as an optical element (see FIG. 1) in both directions, i.e., in an "A"-direction (front side) approaching an object to be photographed (object side) along a direction of the optical axis "L" and in a "B"-direction (rear side) approaching an opposite side (imaging element side/image side) to the object to be photographed. The photographing unit 1 is formed in a substantially rectangular prism shape. The photographing unit 1 generally includes a movable body 3 which holds optical elements such as a plurality of the lenses 1*a* (see FIG. 1) and a fixed diaphragm on its inner side, a magnetic drive mechanism 5 for moving the movable body 3 along an optical axis "L" direction, and a support body 2 on which the magnetic drive mechanism 5, the movable body 3 and the like are mounted. The movable body 3 is provided with a lens holder 12 in a cylindrical tube shape which holds the lenses 1*a* and the fixed diaphragm (not shown) and a coil holder 13 which holds the lens holder 12 on its inner side. Lens drive coils 30*s* and 30*t* structuring the lens drive mechanism 5 are held on an outer peripheral side face of the coil holder 13.

The support body 2 includes a spring holder 19 which holds a spring described below on an opposite side to an object side ("−Z" side), a circuit board holder 16 in a rectangular plate shape which positions a circuit board 15 on an opposite side to the object side ("−Z" side) with respect to the spring holder 19, a case 18 in a box shape which is fitted to the spring holder 19 from the object side, and a spacer 11 in a rectangular plate shape which is disposed on an inner side of the case 18. An imaging element 1*b* is mounted on a circuit board face of the circuit board 15 which is directed to the object side. Further, a filter 1*c* such as an infrared filter is held by the spring holder 19. Incident windows 11*a* and 18*a* for taking light from an object to be photographed into the lenses 1*a* are respectively formed at the centers of the spacer 11 and the case 18. Further, windows 16*a* and 19*a* for guiding the incident light to the imaging element 1*b* are formed at the centers of the circuit board holder 16 and the spring holder 19.

The case 18 is made of a ferromagnetic plate such as a steel plate and functions as a yoke. Therefore, the case 18 structures an interlinkage magnetic field generating body together with lens drive magnets 17 described below for generating a magnetic field interlinking with the lens drive coils 30*s* and 30*t*. The interlinkage magnetic field generating body structures the lens drive mechanism 5 together with the lens drive coils 30*s* and 30*t* which are wound around an outer peripheral face of the coil holder 13.

The support body 2 and the movable body 3 are connected with each other through metal spring members 14*s* and 14*t* which are disposed at separated positions in the optical axis direction. In this embodiment, the spring member 14*s* is used on the imaging element 1*b* side and the spring member 14*t* is used on an object to be photographed side. Basic structures of the spring members 14*s* and 14*t* are similar to each other and each of the spring members 14*s* and 14*t* is provided with an outer peripheral side connecting part 141 which is held by the support body 2, a circular ring-shaped inner peripheral side connecting part 142 which is held by the movable body 3, and arm parts 143 having a thinner width which are connected with the outer peripheral side connecting part 141 and the inner peripheral side connecting part 142. The outer peripheral side connecting part 141 of the spring member 14*s* on the imaging element 1*b* side is held by the spring holder 19 and its inner peripheral side connecting part 142 is connected with an imaging element side end part of the coil holder 13 of the movable body 3. The arm part 143 of the spring member 14*s* is extended in a circular arc shape in a circumferential direction. The outer peripheral side connecting part 141 of the spring member 14*t* on the object side is held by the spacer 11 and its inner peripheral side connecting part 142 is connected with an object side end part of the coil holder 13 of the movable body 3. The arm part 143 of the spring member 14*t* is extended in a circular arc shape in the circumferential direction while meandering in a radial direction. In this manner, the movable body 3 is supported by the support body 2 through the spring members 14s and 14t so as to be movable in the direction of the optical axis. Each of the spring members 14s and 14t is made of nonmagnetic metal such as beryllium copper or nonmagnetic SUS steel material and is formed by performing press working or etching processing using a photo lithography technique on a thin plate having a certain thickness. The spring member 14s is divided into two spring pieces and respective coil ends of the lens drive coils 30s and 30t are connected with the respective spring pieces. Further, two spring pieces of the spring member 14s are connected with terminals 14a and 14b and thus the spring member 14s functions also as a power supply member for the lens drive coils 30s and 30t.

A ring-shaped magnetic piece 61 is held at an object side end part of the coil holder 13 and the position of the magnetic piece 61 is held at a position on the object side with respect to the lens drive magnets 17. Therefore, the magnetic piece 61 applies an urging force in the direction of the optical axis "L" to the movable body 3 by an attraction force acted between the lens drive magnets 17 and the magnetic piece 61. Accordingly, at a non-energization time (home position), the lens holder 12 is set stationary on the imaging element 1b side by the attraction force between the lens drive magnets 17 and the magnetic piece 61. Further, the magnetic piece 61 acts as a yoke and thus a leakage flux from a magnetic path structured between the lens drive magnets 17 and the lens drive coils 30s and 30t can be reduced. The magnetic piece 61 may be formed in a bar shaped magnetic body or a spherical shaped magnetic body. In a case that the magnetic piece 61 is formed in a ring shape, when the lens holder 12 is to be moved in the optical axis direction, an attraction force acted between the lens drive magnets 17 and the magnetic piece 61 becomes isotropic. In addition, at the time of energization to the lens drive coils 30s and 30t, the magnetic piece 61 is moved in a direction being separated from the lens drive magnets 17 and thus an unnecessary force pressing the lens holder 12 to the imaging element 1b side may not act. Therefore, the lens holder 12 can be moved in the optical axis direction with small electric power.

In the photographing unit 1 in this embodiment, when viewed in the direction of the optical axis "L", the lens 1a (see FIG. 1) is formed in a circular shape but the case 18 used in the support body 2 is formed in a rectangular box shape. Therefore, the case 18 is provided with a rectangular tube-shaped body part 18c and an upper plate part 18b formed with the incident window 18a is provided on an upper face side of the rectangular tube-shaped body part 18c. The lens drive magnets 17 are fixed to inner side face parts corresponding to the corners of a quadrangle of the rectangular tube-shaped body part 18c and the lens drive magnets 17 are respectively comprised of a triangular prism-shaped permanent magnet. Each of four lens drive magnets 17 is divided into two pieces in the direction of the optical axis and is magnetized so that a magnetic pole of its inner face and a magnetic pole of its outer face are different from each other. Therefore, winding directions of the two lens drive coils 30s and 30t around the coil holder 13 are opposite to each other. The movable body 3 which is structured as described above is disposed on an inner side of the case 18. As a result, the lens drive coils 30s and 30t respectively face the lens drive magnets 17 which are fixed to the inner face of the rectangular tube-shaped body part 18c of the case 18 to structure the lens drive mechanism 5.

In the photographing unit 1 structured as described above, the movable body 3 is normally located on the imaging element side (one side in the "Z"-axis direction) and, in this state, when an electric current is supplied to the lens drive coils 30s and 30t in a predetermined direction, an electro-magnetic force directing to the object side (the other side in the "Z"-axis direction) is applied to the respective lens drive coils 30s and 30t. Therefore, the movable body 3 to which the lens drive coils 30s and 30t are fixed begins to move to the object side (front side). In this case, an elastic force restricting movement of the movable body 3 is generated between the spring member 14t and the front end of the movable body 3 and between the spring member 14s and the rear end of the movable body 3. Therefore, when the electro-magnetic force for moving the movable body 3 to the front side and the elastic force for restricting the movement of the movable body 3 are balanced with each other, the movable body 3 is stopped. In this case, when an amount of an electric current supplied to the lens drive coils 30s and 30t is adjusted depending on the elastic force acting on the movable body 3 by the spring members 14s and 14t, the movable body 3 can be stopped at a desired position.

(Structure of Optical Unit 100)

Figure 5A:
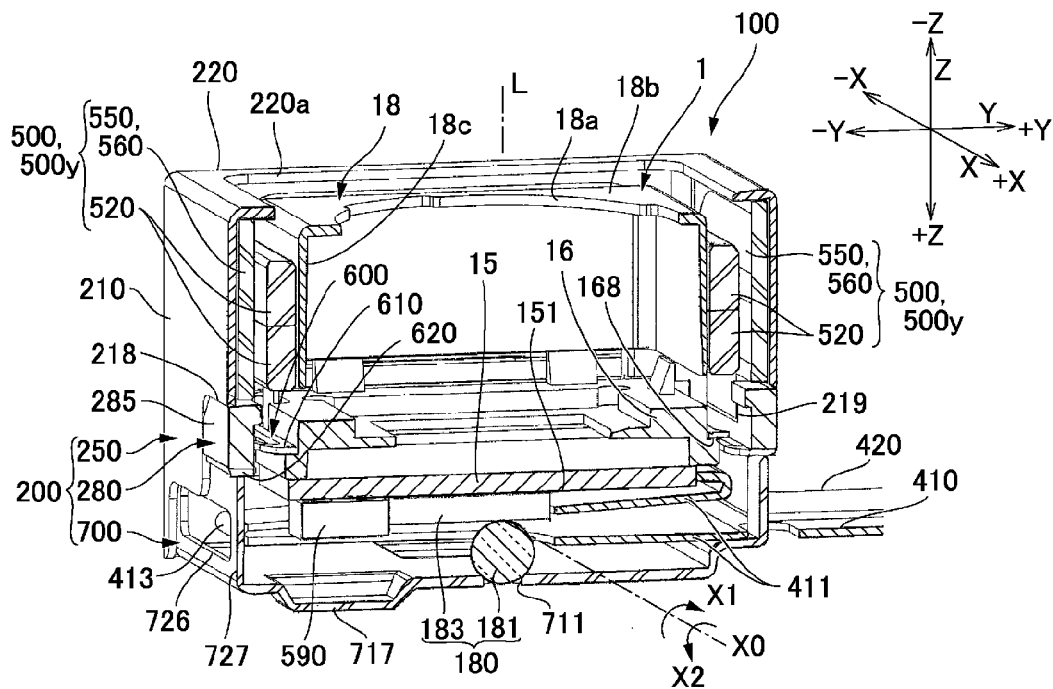
FIGS. 5(a) and 5(b) are cross-sectional views showing an internal structure of an optical unit with a shake correcting function to which at least an embodiment of the present invention is applied.
Figure 5B:
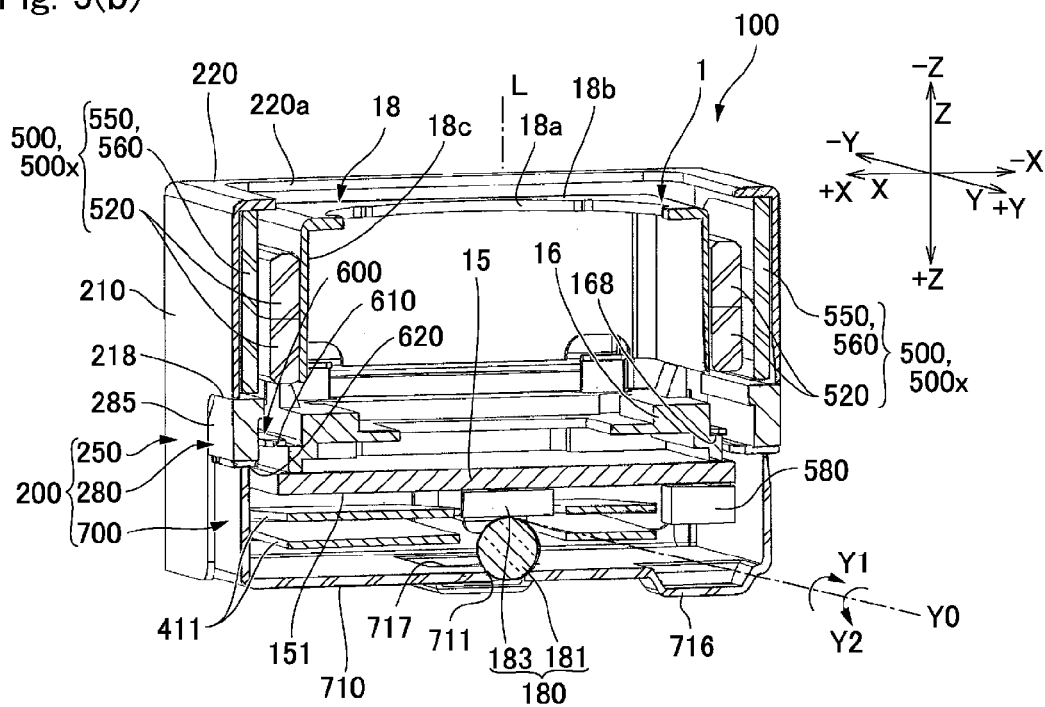
Figure 6:
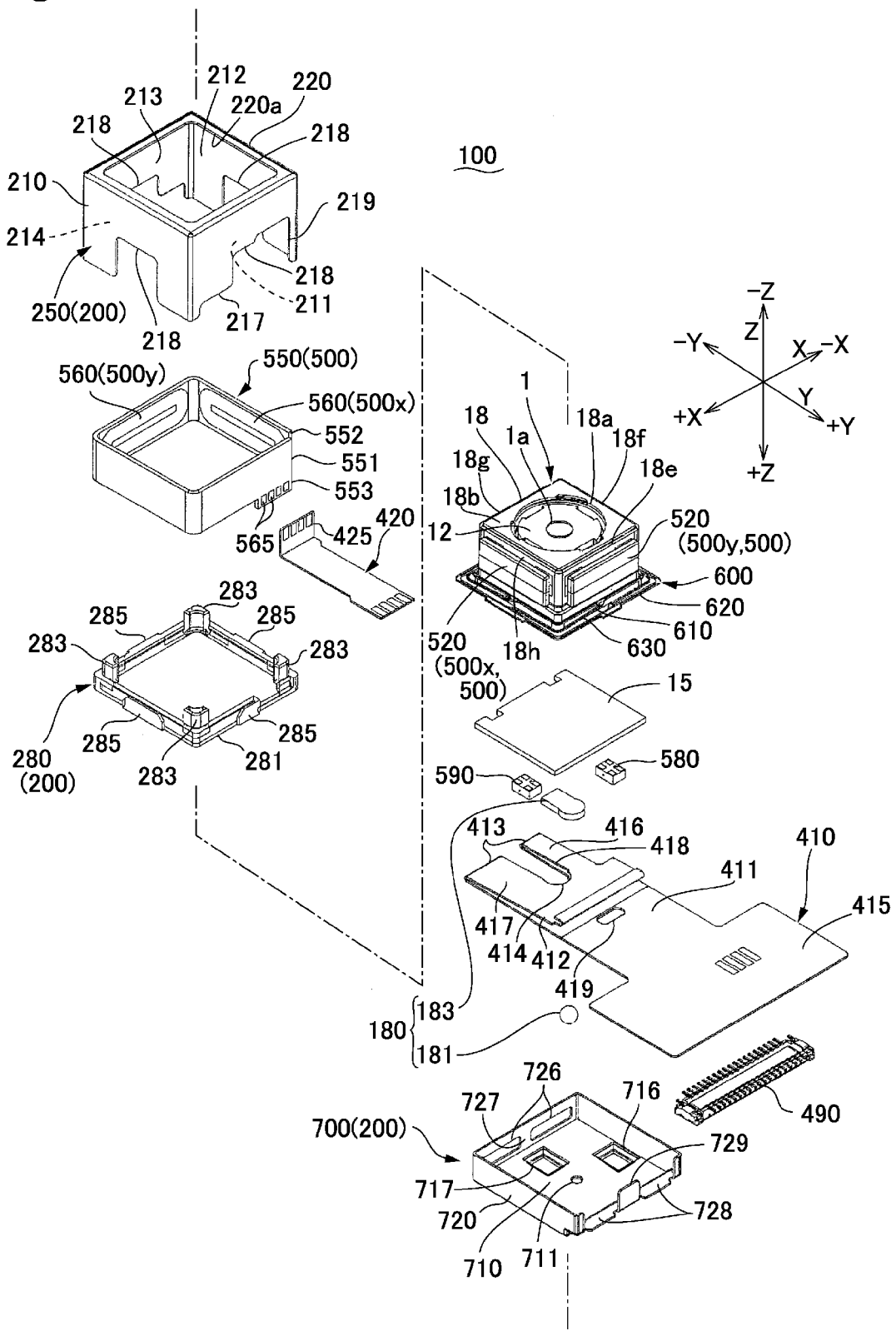
FIG. 6 is an exploded perspective view showing an optical unit with a shake correcting function to which at least an embodiment of the present invention is applied which is viewed from an object to be photographed side.
Figure 7:
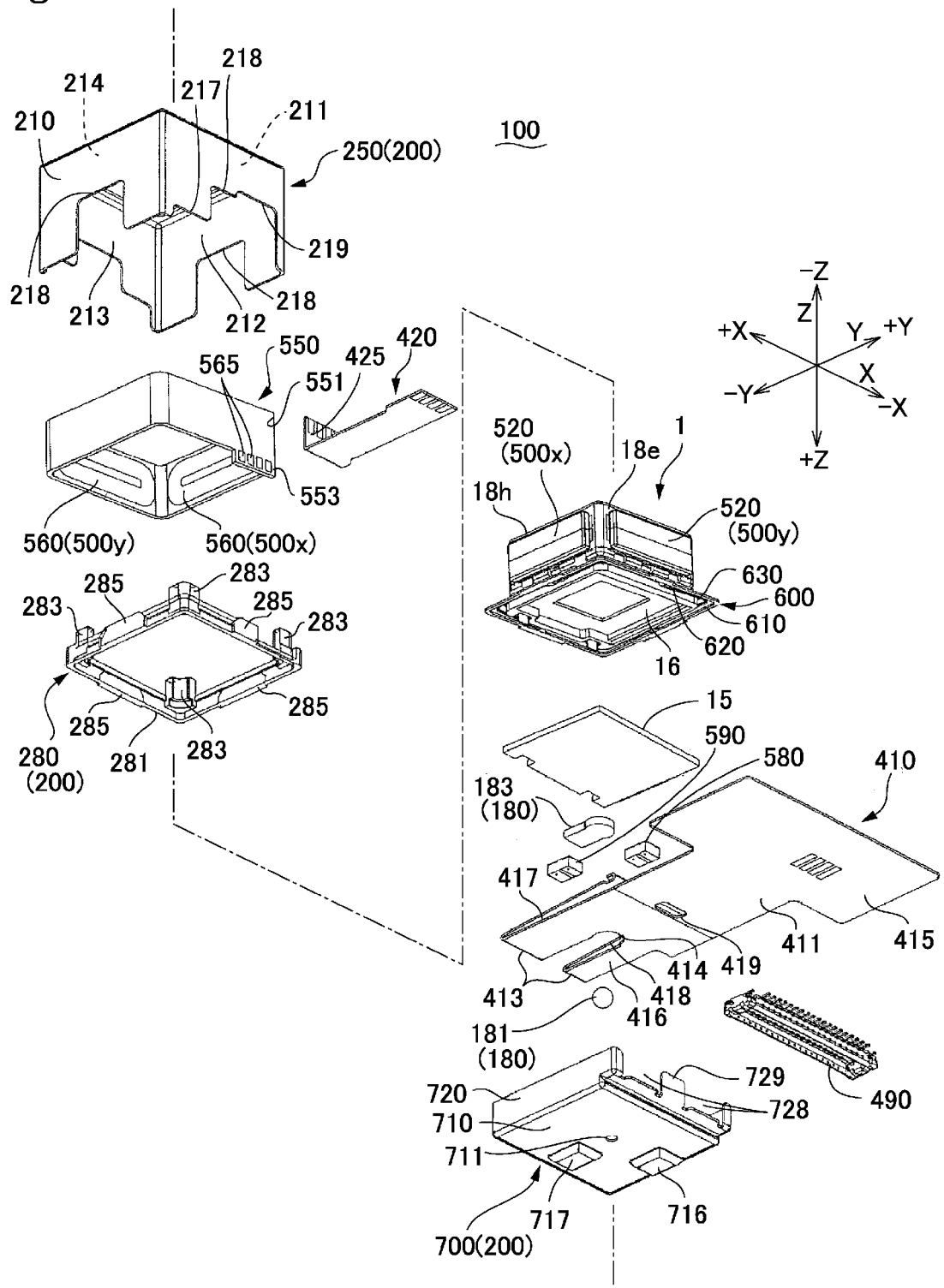
FIG. 7 is an exploded perspective view showing an optical unit with a shake correcting function to which at least an embodiment of the present invention is applied which is viewed from an opposite side to an object to be photographed side.

FIGS. 5(a) and 5(b) are cross-sectional views showing an internal structure of the optical unit 100 with a shake correcting function to which at least an embodiment of the present invention is applied. FIG. 5(a) is a "YZ" cross-sectional view of the optical unit 100 and FIG. 5(b) is an "XZ" cross-sectional view of the optical unit 100. In FIGS. 5(a) and 5(b), only the case 18, the circuit board holder 16 and the circuit board 15 of the photographing unit 1 are shown and other members are not shown. FIG. 6 is an exploded perspective view showing the optical unit 100 with a shake correcting function which is viewed from an object to be photographed side and to which at least an embodiment of the present invention is applied. FIG. 7 is an exploded perspective view showing the optical unit 100 with a shake correcting function which is viewed from an opposite side to an object to be photographed side and to which at least an embodiment of the present invention is applied.

In FIGS. 5(a) and 5(b), and FIGS. 6 and 7, the optical unit 100 includes a fixed body 200, the photographing unit 1, a spring member 600 through which the photographing unit 1 is supported by the fixed body 200 so as to be capable of displacing, and a movable module drive mechanism 500 which generates a magnetic drive force for relatively displacing the photographing unit 1 with respect to the fixed body 200 between the photographing unit 1 and the fixed body 200. An outer peripheral portion of the photographing unit 1 is structured of the case 18 which is used in the support body 2 in the photographing unit 1.

The fixed body 200 is provided with an upper cover 250, a spacer 280 and a lower cover 700 and the upper cover 250 is provided with a rectangular tube-shaped body part 210 which surrounds the photographing unit 1 and an end plate part 220 which closes an opening part on the object side of the rectangular tube-shaped body part 210. The end plate part 220 is formed with a window 220a through which light from an object to be photographed is incident. In the upper cover 250, an end part on the opposite side ("+Z" side) to the object side (side to which the optical axis is extended) of the rectangular tube-shaped body part 210 is formed to be opened. Further, cut-out portions 219 are formed at two positions of the rectangular tube-shaped body part 210 which are faced in the "Y"-axis direction. The cut-out portion 219 on one side "+Y" in the "Y"-axis direction is utilized when the flexible circuit board 420 is to be connected with terminal parts of the sheet-shaped coil 550 described below. Further, cut-out portions 218 which are utilized for engaging with the spacer 280 described below are formed in four faces of the rectangular tube-shaped body part 210. Two of the four cut-out portions 218 located in the "Y"-axis direction are connected with the cut-out portion 219 to structure one cut-out portion. Further, a cut-out portion 217 connected with the cut-out portion 218 is formed at two positions facing in the "Y"-axis direction on the lower end side of the rectangular tube-shaped body part 210. The cut-out portion 217 on one side "+Y" in the "Y"-axis direction is utilized for extending the flexible circuit board 410 to an outer side.

The spacer 280 is provided with a frame part 281 in a quadrangular shape which is sandwiched between the rectangular tube-shaped body part 210 of the upper cover 250 and the lower cover 700, columnar shaped parts 283 which are protruded toward an object side from corner portions of the frame part 281, and engaging protruded parts 285 which are slightly protruded from side portions of the frame part 281 toward outer sides. When the upper cover 250 is fitted to the spacer 280, the engaging protruded part 285 is engaged with the cut-out portion 218 which is cut off in a quadrangular shape in the rectangular tube-shaped body part 210 of the upper cover 250 and, as a result, positioning of the spacer 280 to the upper cover 250 is performed.

The lower cover 700 is a press-worked product made of a metal plate and is provided with a bottom plate part 710 in a substantially rectangular shape and four side plate parts 720 which are stood up toward an object side from an outer circumferential edge of the bottom plate part 710. When the spacer 280 and the upper cover 250 are superposed on the lower cover 700, the frame part 281 of the spacer 280 is sandwiched between the side plate part 720 and the rectangular tube-shaped body part 210 of the upper cover 250.

The side plate part 720 of the lower cover 700 located on one side "+Y" in the "Y"-axis direction is formed with a cut-out portion 728 and a part of the side plate part 720 is left as a plate-shaped projection 729 at a center part of the cut-out portion 728. Further, a window-shaped cut-out portion 726 is formed in the side plate part 720 located on the other side "−Y" in the "Y"-axis direction and a part of the side plate part 720 is left as a crosspiece part 727 at a center part of the cut-out portion 726. The cut-out portion 728 is, as described below, utilized to extend the flexible circuit board 410 to an outer side and the cut-out portion 726 is utilized to prevent a folded-back portion 413 from interfering with the side plate part 720 of the lower cover 700.

A bottom plate part 710 of the lower cover 700 is formed with a hole 711 at its center position and recessed parts 716 and 717 which are recessed in a rectangular shape are formed at a position adjacent to the hole 711 on the other side "−X" in the "X"-axis direction and a position adjacent to the hole 711 on the other side in the "Y"-axis direction. Inner faces of the bottom parts 716a and 717a of the recessed parts 716 and 717 are a substantially mirror surface and the bottom parts 716a and 717a are utilized as reflection faces for a first photo reflector 580 and a second photo reflector 590 which are mounted on a circuit board face of the circuit board 15 on an opposite side to an object side.

(Structure of Swing Support Point)

On one side "+Z" in the "Z"-axis (opposite side to the object side) with respect to the photographing unit 1, a swing support point 180 for swinging the photographing unit 1 is provided between the photographing unit 1 and the lower cover 700 of the fixed body 200. The photographing unit 1 is urged toward the lower cover 700 by the spring member 600 through the swing support point 180. In this embodiment, the swing support point 180 is structured of a steel ball 181, which is positioned by a hole 711 formed in the bottom plate part 710 of the lower cover 700, and a support plate 183 which is fixed to a bottom face 151 of the circuit board 15. The photographing unit 1 is capable of swinging with an abutted position of the steel ball 181 with the support plate 183 as a swing center.

(Structure of Spring Member 600)

The spring member 600 is a plate-shaped spring member which is provided with a fixed side connecting part 620 sandwiched between the side plate part 720 of the lower cover 700 and the frame part 281 of the spacer 280 in the fixed body 200, a movable side connecting part 610 connected with the photographing unit 1, and a plurality of arm parts 630 which are extended between the movable side connecting part 610 and the fixed side connecting part 620. Both ends of the arm part 630 are respectively connected with the movable side connecting part 610 and the fixed side connecting part 620. In this embodiment, the movable side connecting part 610 of the spring member 600 is fixed to a stepped part 168 which is formed on an outer peripheral side of a circuit board holder 16 on a rear end side of the photographing unit 1. The spring member 600 is made of nonmagnetic metal such as beryllium copper or nonmagnetic SUS steel material and is formed by performing a press working or etching processing using a photo lithography technique on a thin plate having a certain thickness.

In this embodiment, when the photographing unit 1 is disposed on an object side with respect to the steel ball 181 in a state that the fixed side connecting part 620 of the spring member 600 is sandwiched between the side plate part 720 of the lower cover 700 and the frame part 281 of the spacer 280 in the fixed body 200, the photographing unit 1 becomes in a state that the photographing unit 1 is pushed up to an object side by the steel ball 181. Therefore, the movable side connecting part 610 of the spring member 600 is set in a state that the movable side connecting part 610 is pushed to the object side with respect to the fixed side connecting part 620 and thus the arm parts 630 of the spring member 600 urges the photographing unit 1 to an opposite side to the object side. Accordingly, the photographing unit 1 is set in a state that the photographing unit 1 is urged toward the bottom plate part 710 of the lower cover 700 through the swing support point 180 by the spring member 600 and thus the photographing unit 1 is set in a supported state by the fixed body 200 so as to be capable of being swung through the swing support point 180.

(Detailed Structure of Shake Correction Drive Mechanism 500)

Figure 8A:
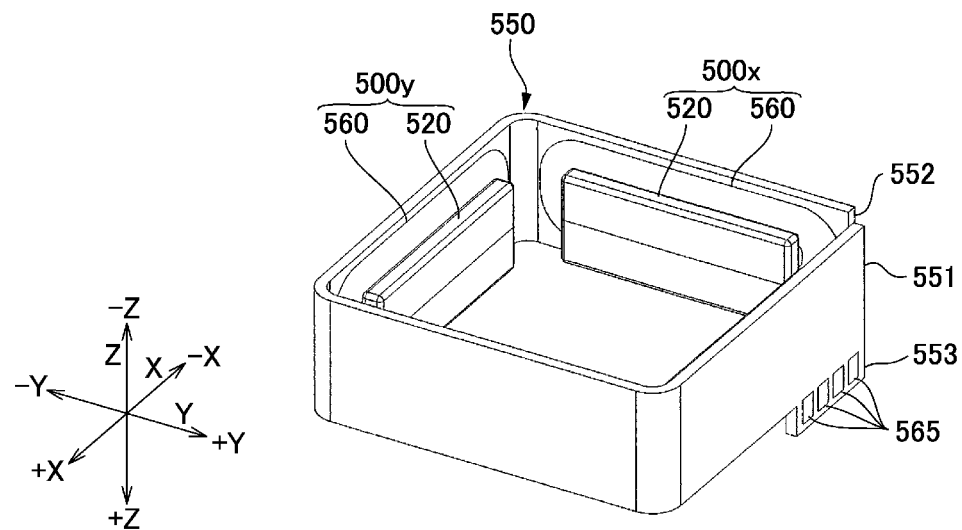
FIGS. 8(a) and 8(b) are explanatory views showing a structure of a shake correction drive mechanism which is structured in an optical unit with a shake correcting function to which at least an embodiment of the present invention is applied.
Figure 8B:
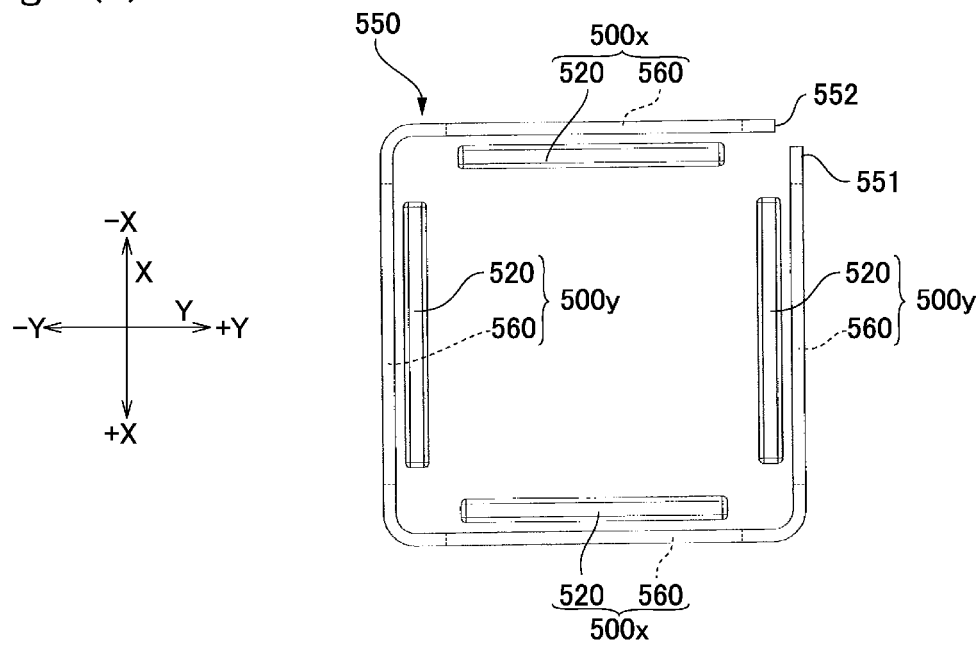
Figure 9A:
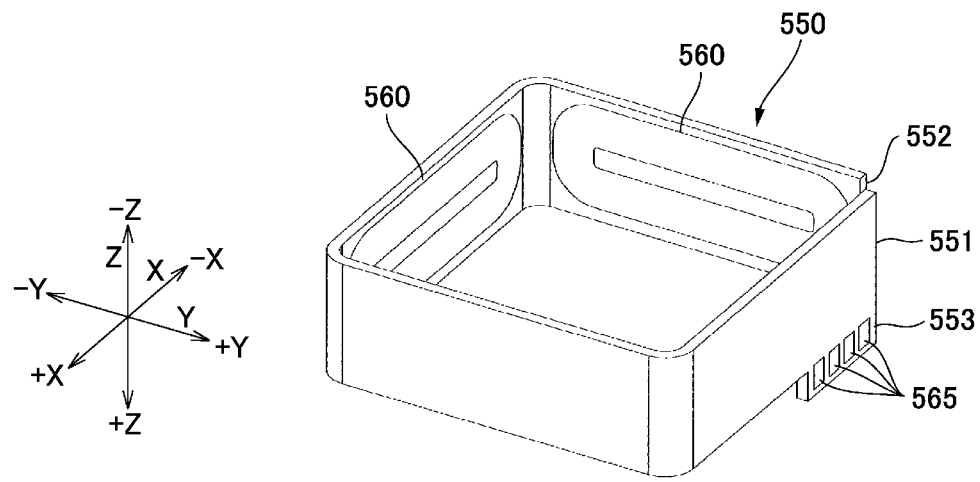
FIGS. 9(a) and 9(b) are explanatory views showing a sheet-shaped coil which is used in a shake correction drive mechanism in an optical unit with a shake correcting function to which at least an embodiment of the present invention is applied.
Figure 9B:
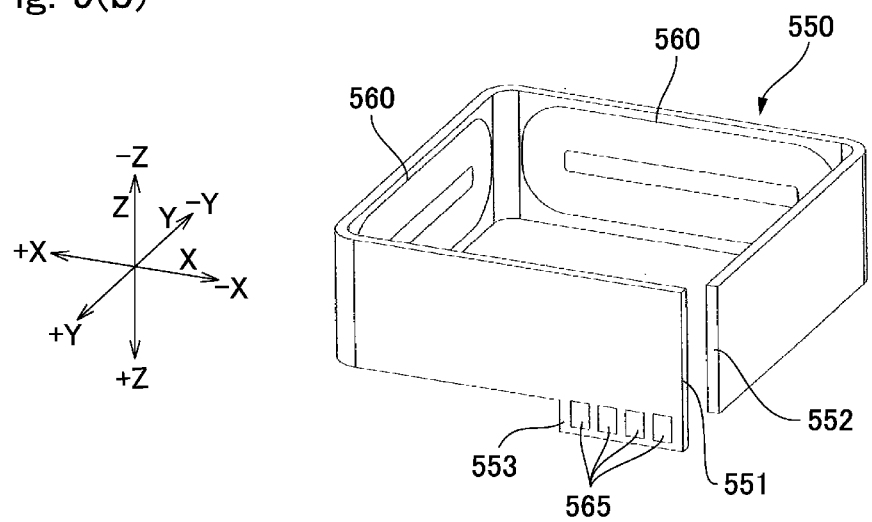

FIGS. 8(a) and 8(b) are explanatory views showing a structure of a shake correction drive mechanism which is structured in the optical unit 100 with a shake correcting function to which at least an embodiment of the present invention is applied. FIG. 8(a) is a perspective view showing a shake correction drive mechanism which is viewed from an object side and FIG. 8(b) is its plan view. FIGS. 9(a) and 9(b) are explanatory views showing a sheet-shaped coil which is used in a shake correction drive mechanism in the optical unit 100 with a shake correcting function to which at least an embodiment of the present invention is applied. FIG. 9(a) is a perspective view showing a sheet-shaped coil which is viewed from an object side and FIG. 9(b) is a perspective view when the sheet-shaped coil is viewed at another angular position.

As shown in FIGS. 5(a) through 8(b), in the optical unit 100 in this embodiment, the shake correction drive mechanism 500 is structured of coil parts 560 and permanent magnets 520 for generating magnetic fields interlinking with the coil parts 560. Specifically, four outer faces 18e, 18f, 18g and 18h of the rectangular tube-shaped body part 18c of the case 18 of the photographing unit 1 are fixed with a flat plate-shaped permanent magnet 520 and the coil part 560 is disposed on inner faces 211, 212, 213 and 214 of the rectangular tube-shaped body part 210 of the upper cover 250. The permanent magnet 520 is magnetized so that the pole of its outer side and the pole of its inner side are different from each other. Further, the coil part 560 is formed in a quadrangular frame shape and its upper and lower long side portions are utilized as an effective side.

In the permanent magnets 520 and the coil parts 560, the permanent magnets 520 and the coil parts 560 disposed at two positions so as to interpose the photographing unit 1 from both sides in the "Y"-axis direction structure a "Y"-side shake correction drive mechanism 500y and, as shown by the arrows "X1" and "X2" in FIG. 5(a), the photographing unit 1 is swung with the axial line "X0" extending in the "X"-axis direction passing through the swing support point 180 as a swing center. Further, the permanent magnets 520 and the coil parts 560 disposed at two positions so as to interpose the photographing unit 1 from both sides in the "X"-axis direction structure an "X"-side shake correction drive mechanism 500x and, as shown by the arrows "Y1" and "Y2" in FIG. 5(b), the photographing unit 1 is swung with the axial line "Y0" extending in the "Y"-axis direction passing through the swing support point 180 as a swing center.

In order to structure the "Y"-side shake correction drive mechanism 500y and the "X"-side shake correction drive mechanism 500x, in this embodiment, a sheet-shaped coil 550 is used so as to be extended along the four inner faces 211, 212, 213 and 214 of the upper cover 250 and four coil parts 560 are integrally formed in the sheet-shaped coil 550 with a predetermined distance therebetween. Further, when the sheet-shaped coil 550 is developed, the sheet-shaped coil 550 is provided with a shape extended in a belt shape and is fixed to the four inner faces 211, 212, 213 and 214 of the upper cover 250 by a method such as surface bonding in a state that the sheet-shaped coil 550 is bent along the inner faces 211, 212, 213 and 214 of the upper cover 250. In this state, both end parts 551 and 552 of the sheet-shaped coil 550 are set close to each other through a slit 555.

The sheet-shaped coil 550 is structured so that the coil part 560 made of a minute copper wiring line is formed on a printed circuit board by utilizing an electric conduction wiring technique. A plurality of copper wiring layers (coil part 560) is formed in multi-layer through an insulation film. Further, the surface of the copper wiring line (surface of the coil part 560) is covered with an insulation film. For example, an FP coil (fine pattern coil (registered mark)) made by ASAHI KASEI ELECTRONICS CO., LTD. may be used as the sheet-shaped coil 550.

In this embodiment, one end part 551 of the sheet-shaped coil 550 is formed with a protruded part 553 which is protruded in a rectangular shape to an opposite side to the object side and the protruded part 553 is formed with a plurality of terminal parts 565 by electrically conducting layers extended from the four coil parts 560. In this embodiment, the terminal parts 565 are disposed on an outer face of the sheet-shaped coil 550 which is opposite to the inner side facing the permanent magnet 520. Further, as shown in FIGS. 2(a) and 2(b), and FIGS. 6 and 7, the cut-out part 219 is formed in the portion of the upper cover 250 which is overlapped with the terminal parts 565. Therefore, since the terminal parts 565 (protruded part 553) of the sheet-shaped coil 550 are exposed to the outer side, the sheet-shaped coil 550 and an end part 425 of the flexible circuit board 420 which is bent toward the direction of the optical axis "L" are electrically connected with each other in the cut-out part 219 by soldering or the like.

In the optical unit 100 which is structured as described above, the photographing unit 1 is supported by the fixed body 200 in a state that the photographing unit 1 is capable of swinging through the swing support point 180. Therefore, when a large force is applied from the outside to swing the photographing unit 1 largely, the arm parts 630 of the spring member 600 may be plastically deformed. In this embodiment, the sheet-shaped coil 550 and the permanent magnet 520 are faced each other through a narrow gap space. Further, in a case of the sheet-shaped coil 550, different from an air-core coil, a wound coil is not loosened even when the coil is abutted with the permanent magnet 520. Therefore, in the optical unit 100 in this embodiment, movable ranges of the photographing unit 1 in the "X"-axis direction and the "Y"-axis direction intersecting with the optical axis "L" are restricted by abutting of the sheet-shaped coil 550 with the permanent magnet 520 and another stopper mechanism for preventing the swing of the photographing unit 1 is not provided.

(Shake Correcting Operation)

In the optical unit 100 in this embodiment, when the optical device 1000 shown in FIG. 1 is shaken, the shake is detected by a gyroscope and the host control section controls the shake correction drive mechanism 500 based on a detection result by the gyroscope. In other words, a drive current for cancelling the shake which is detected by the gyroscope is supplied to the coil parts 560 of the sheet-shaped coil body 550 through the flexible circuit board 410 and the flexible circuit board 420. As a result, the "X"-side shake correction drive mechanism 500x swings the photographing unit 1 around the "Y"-axis with the swing support point 180 as a swing center. Further, the "Y"-side shake correction drive mechanism 500y swings the photographing unit 1 around the "X"-axis with the swing support point 180 as the swing center. Further, when the swing around the "X"-axis and the swing around the "Y"-axis of the photographing unit 1 are combined with each other, the photographing unit 1 is displaced over the entire "XY" plane. Accordingly, all shakes occurred in the optical unit 100 can be corrected surely.

(Structure of Flexible Circuit Board 410)

In the optical unit 100 in this embodiment, one end part of the flexible circuit board 410 is connected with the circuit board 15 of the photographing unit 1. In a case that the photographing unit 1 is to be swung, when the flexible circuit board 410 applies a load to the photographing unit 1, an appropriate swing of the photographing unit 1 may be obstructed.

The main body portion 415 of the flexible circuit board 410 which is located on an outer side of the optical unit 100 is formed in a wide width so as to be capable of mounting a connector 490 and being connected with the flexible circuit board 420. However, in order to prevent the above-mentioned problem, a portion of the flexible circuit board 410 which is located on an inner side of the optical unit 100 is formed in a strip-shaped portion 411 whose width dimension is narrower than the main body portion 415. Further, the strip-shaped portion 411 is extended from one side "+Y" in the "Y"-axis direction toward the other side "−Y" and then, the strip-shaped portion 411 is folded back toward the one side "+Y" and, after that, an end part of the strip-shaped portion 411 is folded back along an edge of the circuit board 15 so as to be directed toward a circuit board face on the object side of the circuit board 15 and fixed. Therefore, since the flexible circuit board 410 is provided with the folded-back portion 413 between the main body portion 415 disposed on the outer side and the portion fixed to the circuit board 15 and thus its dimension is long. Accordingly, the strip-shaped portion of the flexible circuit board 410 is capable of following a shake of the photographing unit 1 smoothly and thus a large load is not applied to the photographing unit 1.

Further, the strip-shaped portion 411 of the flexible circuit board 410 is formed at a midway portion in its length direction with a slit 418 which is extended along an extended direction ("Y"-axis direction) of the strip-shaped portion 411 and the midway portion of the strip-shaped portion 411 is divided into two thinner width portions 416 and 417 in a widthwise direction. Therefore, the rigidity of the strip-shaped portion 411 is relaxed. Accordingly, the strip-shaped portion of the flexible circuit board 410 is capable of following a shake of the photographing unit 1 smoothly and thus a large load is not applied to the photographing unit 1.

In this embodiment, the strip-shaped portion 411 of the flexible circuit board 420 is superposed on the photographing unit 1 in the optical axis "L" direction. However, the portion of the strip-shaped portion 411 which is superposed on the swing support point 180 is formed with a circular hole 414 connected with the slit 418. Therefore, even when the strip-shaped portion 411 of the flexible circuit board 420 is disposed at a position superposed on the photographing unit 1 in the optical axis "L" direction, the swing support point 180 is provided without a problem.

Further, in the side plate part 720 of the lower cover 700, the side plate part 720 located on one side "+Y" in the "Y"-axis direction is formed with the cut-out portion 728 for extending the strip-shaped portion 411 of the flexible circuit board 420 and a part of the side plate part 720 is left as a plate-shaped projection 729 at the center part of the cut-out portion 728. However, a hole 419 in an elliptic shape is formed in a portion of the strip-shaped portion 411 of the flexible circuit board 420 which is superposed on the plate-shaped projection 729. Therefore, when the strip-shaped portion 411 of the flexible circuit board 420 is extended to an outer side through the cut-out portion 728 of the side plate part 720, the plate-shaped projection 729 is inserted into the hole 419 and thus the strip-shaped portion 411 of the flexible circuit board 420 is extended to the outer side without a problem. Further, since the plate-shaped projection 729 is fitted to the hole 419, positioning of the strip-shaped portion 411 of the flexible circuit board 420 can be performed.

In addition, in the side plate part 720 of the lower cover 700, the side plate part 720 located on the other side "−Y" in the "Y"-axis direction is formed with the cut-out portion 726 in a window shape. Therefore, the folded-back portion 413 of the flexible circuit board 410 is located in the vicinity of the side plate part 720, the folded-back portion 413 and the side plate part 720 are not interfered with each other. Therefore, when the photographing unit 1 is swung, an unnecessary load due to interference of the folded-back portion 413 with the side plate part 720 is not applied to the photographing unit 1.

In addition, the folded-back portion 413 of the flexible circuit board 410 is located at the same height position as the swing center of the photographing unit 1 in the swing support point 180 (abutting position of the steel ball 181 with the support plate 183). Therefore, when the photographing unit 1 is swung, the displacement of the strip-shaped portion 411 is restrained small. Accordingly, affection of the flexible circuit board 410 applied to the photographing unit 1 is reduced and thus the photographing unit 1 is swung with a high degree of accuracy.

(Principal Effects in this Embodiment)

As described above, in the optical unit 100 with a shake correcting function in this embodiment, the permanent magnets 520 are provided on plural positions of the outer peripheral face of the photographing unit 1 which is the movable module so as to be separated in the circumferential direction around the optical axis "L", and the fixed body 200 is provided with the sheet-shaped coil 550 having a plurality of coil parts 560 which is extended in the circumferential direction so that the coil parts 560 face the permanent magnets 520. Therefore, in a case that a shake such as a hand shake occurs in the optical unit 100, when electrical power is supplied to the coil parts 560 of the sheet-shaped coil 550, the photographing unit 1 is swung. Accordingly, even when the optical unit 100 is shaken, inclination of the optical axis "L" can be corrected. In order to structure the shake correction drive mechanism 500, in this embodiment, the sheet-shaped coil 550 is used. Therefore, in comparison with a case that an air-core coil is used, a distance between the photographing unit 1 and the fixed body 200 can be narrowed and thus the size of the optical unit 100 can be reduced. Further, in a case of the sheet-shaped coil 550, a plurality of coil parts 560 is integrally formed with the terminal parts 565 and thus, even when the coil parts 560 are disposed at plural positions around the optical axis "L", it is sufficient that the sheet-shaped coil 550 is extended around the optical axis "L". Therefore, different from a case that an air-core coil is used, an air-core coil is not required to be disposed at plural positions around the optical axis "L" and the respective air-core coils are not required to be electrically connected and thus, according to this embodiment, assembly man-hours are reduced. As a result, according to this embodiment, even when the shake correction drive mechanism 500 is provided between the photographing unit 1 and the fixed body 200, increase of the size and the assembly man-hours can be restrained to a minimum.

Further, the terminal parts 565 of the sheet-shaped coil 550 are disposed so as to face the outer side which is an opposite side to a side facing the permanent magnet 520 and thus electrical connection with the coil parts 560, in other words, connection of the flexible circuit board 420 with the terminal parts 565 can be performed easily.

Further, a movable range of the photographing unit 1 in a direction intersecting the optical axis "L" is restricted by abutting of the sheet-shaped coil 550 with the permanent magnet 520. Even in this structure, in a case of the sheet-shaped coil 550, different from an air-core coil, a wound coil is not loosened even when the coil is abutted with the permanent magnet 520. Therefore, the abutting of the sheet-shaped coil 550 with the permanent magnet 520 can be utilized to restrict the movable range of the photographing unit 1.

(First Improved Example for Positional Relationship Between Sheet-Shaped Coil 550 and Permanent Magnet 520)

Figure 10A:
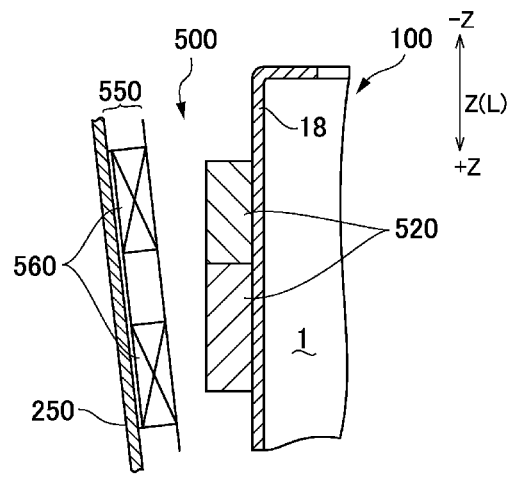
FIGS. 10(a), 10(b) and 10(c) are explanatory views showing an optical unit with a shake correcting function in accordance with an improved example of an embodiment of the present invention.
Figure 10B:
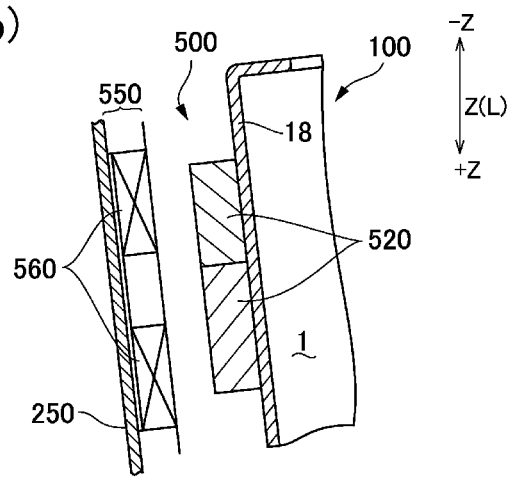
Figure 10C:
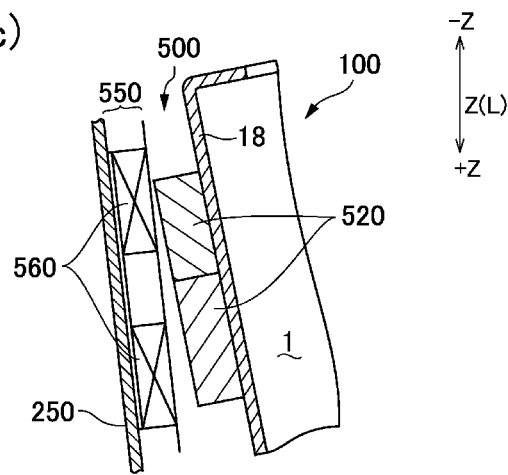

FIGS. 10(a), 10(b) and 10(c) are explanatory views showing an optical unit 100 with a shake correcting function in accordance with an improved example of an embodiment of the present invention. A basic structure in this embodiment is similar to the above-mentioned embodiment and thus the common portions are shown with the same reference sign and their descriptions are omitted.

As shown in FIG. 10(a), even in the optical unit 100 with a shake correcting function in this embodiment, in the shake correction drive mechanism 500, the sheet-shaped coil 550 and the permanent magnet 520 are faced each other. In this embodiment, in a state that power supply to the coil part 560 is stopped, a distance between the permanent magnet 520 and the sheet-shaped coil 550 is widened as being separated or apart in the optical axis "L" direction from the swing center of the photographing unit 1 (see FIGS. 5(a) and 5(b) and the like). In this embodiment, the swing support point 180 is located on one side "+Z" (opposite side to an object side) in the "Z"-axis direction and thus a distance between the permanent magnet 520 and the sheet-shaped coil 550 becomes to be widened toward the other side "−Z" (toward the object side) from the one side "+Z" in the "Z"-axis direction.

According to this structure, as shown in FIG. 10(b), the permanent magnet 520 and the sheet-shaped coil 550 are faced each other in parallel on the side to which the photographing unit 1 is inclined and thus an average distance between the permanent magnet 520 and the coil part 560 becomes narrow. Therefore, in the shake correction drive mechanism 500, a force for swinging the photographing unit 1 is generated efficiently. Further, as shown in FIG. 10(c), in a case that the permanent magnet 520 and the sheet-shaped coil 550 are abutted with each other, it is avoided that a corner portion of the permanent magnet 520 is strongly abutted with the sheet-shaped coil 550. Therefore, the sheet-shaped coil 550 and the permanent magnet 520 are surely prevented from being damaged.

In order to attain this structure, for example, it may be structured that the rectangular tube-shaped body part 210 of the upper cover 250 in the fixed body 200 is formed in an inclined face, or that the rectangular tube-shaped body part 18c of the case 18 in the photographing unit 1 is formed in an inclined face, or that a thickness dimension of the permanent magnet 520 is varied in the optical axis "L" direction.

(Second Improved Example for Positional Relationship Between Sheet-Shaped Coil 550 and Permanent Magnet 520)

Figure 11A:
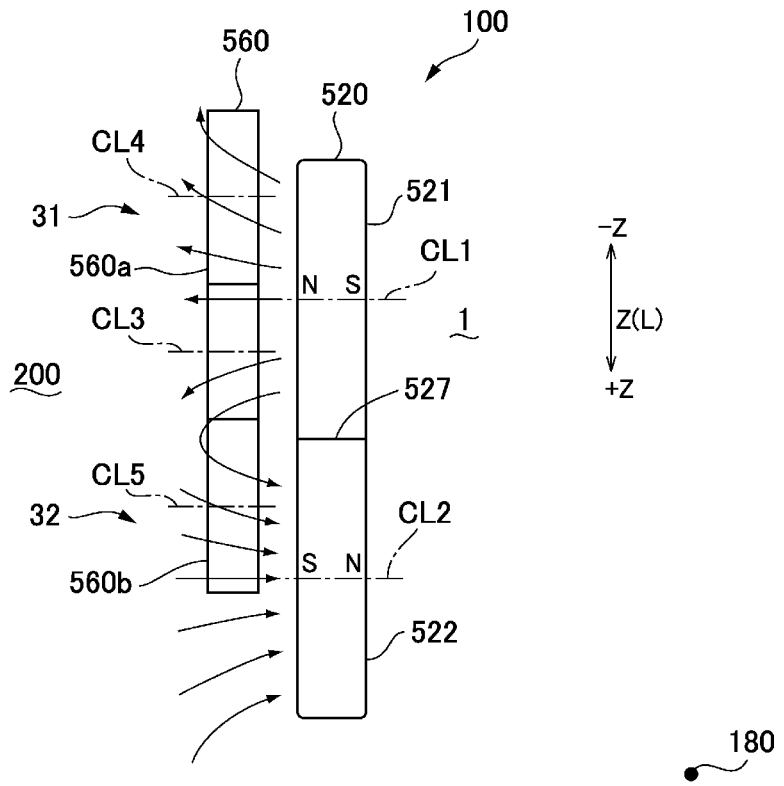
FIGS. 11(a) and 11(b) are explanatory views showing an optical unit with a shake correcting function in accordance with another improved example of an embodiment of the present invention.
Figure 11B:
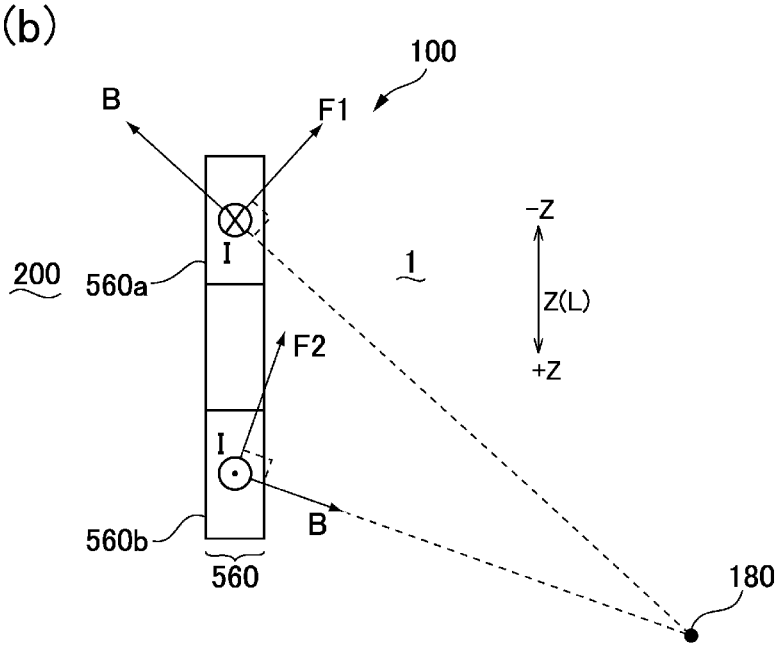

FIGS. 11(a) and 11(b) are explanatory views showing an optical unit 100 with a shake correcting function in accordance with another improved example of an embodiment of the present invention. A basic structure in this embodiment is similar to the above-mentioned embodiment and thus the common portions are shown with the same reference sign and their descriptions are omitted.

As shown in FIG. 11(a), even in an optical unit 100 with a shake correcting function in this embodiment, the sheet-shaped coil 550 and the permanent magnet 520 are faced each other in the shake correction drive mechanism 500 and upper and lower long side portions of the coil part 560 are utilized as an effective side. In this embodiment, the permanent magnet 520 is structured of a first magnet piece 521 and a second magnet piece 522 which are disposed in the optical axis direction, and the first magnet piece 521 and the second magnet piece 522 are magnetized so that their magnetic poles located on a coil part 560 side are different from each other. Therefore, magnetic lines of force generated from the permanent magnet 520 are, for example, formed as shown by the arrows in FIG. 11(a). Accordingly, on the object side in the optical axis "L" direction with respect to the center "CL1" of the first magnet piece 521, a first region 31 is formed in which the directions of the magnetic lines of force from the first magnet piece 521 are set in directions substantially going away from the swing support point 180 (see FIGS. 5(a) and 5(b)). On the other hand, on the object side in the optical axis "L" direction with respect to the center "CL2" of the second magnet piece 522, a second region 32 is formed in which the directions of the magnetic lines of force from the second magnet piece 522 are set in directions substantially going toward the swing support point 180.

In this embodiment, the permanent magnet 520 and the coil part 560 are oppositely disposed to each other so that the center "CL3" of the coil part 560 in the optical axis direction is disposed on an upper side with respect to the abutting face 527 of the first magnet piece 521 with the second magnet piece 521. In other words, the center "CL3" of the coil part 560 is disposed on the object side which is apart from the swing support point 180 in the optical axis direction with respect to the abutting face 527 which is the magnetic center of the permanent magnet 520. Therefore, the center "CL4" of the long side part 560a of the coil part 560 is disposed on the object side with respect to the center "CL1", which is the magnetic center of the first magnet piece 521, and the center "CL5" of the long side part 560b is disposed on the object side with respect to the center "CL2" which is the magnetic center of the second magnet piece 521. In other words, the long side part 560a is disposed in the first region 31 and the long side part 560b is disposed in the second region 32.

Therefore, as shown in FIG. 11(b), a direction of the electro-magnetic force "F1" generated in the long side part 560a by supplying an electric current to the coil 560 is substantially coincided with a tangential direction of a circle whose center is the swing support point 180 and which passes the long side part 560a. Further, a direction of the electro-magnetic force "F2" generated in the long side part 560b by supplying an electric current to the coil 560 is substantially coincided with a tangential direction of a circle whose center is the swing support point 180 and which passes the long side part 560b. In other words, the directions of the electro-magnetic forces "F1" and "F2" generated in the coil part 560 by supplying an electric current to the coil part 560 are substantially coincided with directions generating swing forces for swinging the photographing unit 1 with the swing support point 180 as a swing center. Therefore, a drive force of the shake correction drive mechanism 500 is enhanced by effectively utilizing the magnetic flux generated from the permanent magnet 520.

Further, in this embodiment, the center "CL3" of the coil part 560 is disposed at a remote position in the optical axis direction from the swing support point 180 with respect to the abutting face 527 of the permanent magnet 520. Therefore, in comparison with a case that the abutting face 527 of the permanent magnet 520 and the center "CL3" of the coil part 560 are disposed at an equivalent position in the optical axis direction to the swing support point 180, a torque for swinging the photographing unit 1 with the swing support point 180 as a swing center is large. Accordingly, a drive force of the shake correction drive mechanism 500 is enhanced.

In addition, in this embodiment, the long side part 560a of the coil part 560 is disposed in the first region 31 and the long side part 560b of the coil part 560 is disposed in the second region 32. Therefore, in comparison with a case that the short side parts are disposed in the first region 31 and the second region 32, the drive force of the shake correction drive mechanism 500 is further enhanced.

(Structure of Surface of Permanent Magnet 520)

In the optical unit 100 with a shake correcting function in accordance with the above-mentioned embodiments, in order to surely prevent the sheet-shaped coil 550 and the permanent magnet 520 from being damaged when the permanent magnet 520 and the sheet-shaped coil 550 are abutted with each other, a resin layer may be formed on a face of the permanent magnet 520 which faces the sheet-shaped coil 550.

In order to realize this structure, for example, it may be structured that resin is coated on the surface of the permanent magnet 520 after the permanent magnet 520 is attached to the photographing unit 1, or it may be structured that the permanent magnet 520 whose surface has been coated with resin is attached to the photographing unit 1. In the former case, it is structured that the resin is coated on only the front face of the permanent magnet 520. Further, in the latter case, it is structured that the resin is coated on only the front face of the permanent magnet 520 or that the resin is coated on the front face and the rear face (face on the photographing unit 1 side) of the permanent magnet 520.

(Another Structure of Sheet-Shaped Coil 550)

In the embodiment described above, the sheet-shaped coil 550 (FP coil) is used which is provided with the coil part 560 structured by stacking plural wiring line layers through insulation films on a circuit board. However, a sheet-shaped coil 550 may be used which is provided with a circuit board oppositely disposed to the permanent magnet and a plurality of air-core coils which are fixed to an opposite face of the circuit board to the side facing the permanent magnet to structure the coil part 520.

Other Embodiments

In the embodiments described above, at least an embodiment of the present invention is, as an example, applied to the optical unit 100 which is used in a cell phone with a camera. However, at least an embodiment of the present invention may be applied to the optical unit 100 which is used in a thin type digital camera or the like. Further, in the embodiment described above, the lens drive mechanism 5 which magnetically drives the movable body 3 including the photographing unit 1 having the lens 1a and the imaging element 1b in the optical axis direction is supported on the support body 2. However, at least an embodiment of the present invention may be applied to a fixed focus type optical unit in which the lens drive mechanism 5 is not mounted on the photographing unit 1.

In addition, other than a cell phone, a digital camera and the like, the optical unit 100 with a shake correcting function to which at least an embodiment of the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with an attitude stabilizing device, a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correcting function to which at least an embodiment of the present invention is applied is mounted at a position which is capable of photographing toward a front side in a car, it can be used as a drive recorder. Further, it may be structured that the optical unit 100 with a shake correcting function to which at least an embodiment of the present invention is applied is mounted at a position which is capable of photographing toward a front side in a car and a front side image is photographed automatically at a constant interval, which is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which at least an embodiment of the present invention is applied may be applied to shake correction of an optical device from which a light beam is emitted such as a laser beam pointer, a portable or on-vehicle projection display device and direct viewing type display device. Further, in an observation system with a high magnification such as an astronomical telescope system or a binocular system, the optical unit 100 may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correcting function comprising:
   a fixed body;
   a movable module which holds an optical element; and
   a shake correction drive mechanism which is structured to generate a drive force for swinging the movable module with respect to the fixed body;
   wherein the shake correction drive mechanism comprises:
      a plurality of permanent magnets which are provided on an outer peripheral face of the movable module at positions separated in a circumferential direction around an optical axis of the optical element; and
      a sheet-shaped coil which is extended in a circumferential direction in the fixed body and is integrally provided with a plurality of coil parts facing the permanent magnets and a terminal part electrically connected with the coil parts; and
   wherein the coil part is structured of a plurality of wiring line layers which are stacked through an insulation film on a circuit board.

2. The optical unit with a shake correcting function according to claim 1, wherein the sheet-shaped coil comprises:
   a circuit board which is oppositely disposed to the permanent magnet; and
   a plurality of air-core coils which are fixed to a face of the circuit board opposite to a side facing the permanent magnet to structure the coil parts.

3. The optical unit with a shake correcting function according to claim 1, wherein the terminal part is disposed on an outer face of the sheet-shaped coil which is a side opposite to a side facing the permanent magnet.

4. The optical unit with a shake correcting function according to claim 1, wherein a movable range of the movable module in a direction intersecting the optical axis is restricted by abutting of the sheet-shaped coil with the permanent magnet.

5. The optical unit with a shake correcting function according to claim 4, further comprising a resin layer which is formed on a face of the permanent magnet facing the sheet-shaped coil.

6. The optical unit with a shake correcting function according to claim 1, wherein a distance between the permanent magnet and the sheet-shaped coil is widened as being separated in a direction of the optical axis from a swing center of the movable module.

7. The optical unit with a shake correcting function according to claim 6, wherein
  the coil part is disposed within a first region where directions of magnetic lines of force generated from the permanent magnet are directions substantially going away from the swing center of the movable module, and/or
  the coil part is disposed within a second region where directions of the magnetic lines of force generated from the permanent magnet are directions substantially going toward the swing center.

8. The optical unit with a shake correcting function according to claim 6, wherein the movable module holds an imaging element and a lens as the optical element.

9. The optical unit with a shake correcting function according to claim 1, further comprising
  a swing support point which is structured to swingably support the movable module between a rear end portion in an optical axis direction of the movable module and the fixed body, and
  a spring member in a plate shape which is provided with a fixed side connecting part connected with the fixed body, a movable side connecting part connected with the movable module, and a plurality of arm parts extended between the fixed side connecting part and the movable side connecting part, the spring member being structured to urge the movable module toward the swing support point,
  wherein the shake correction drive mechanism swings the movable module with the swing support point as a swing center.

10. The optical unit with a shake correcting function according to claim 9, wherein
  the coil part is structured of a plurality of wiring line layers which are stacked through an insulation film on a circuit board, and
  a movable range of the movable module in a direction intersecting the optical axis is restricted by abutting of the sheet-shaped coil with the permanent magnet.

11. The optical unit with a shake correcting function according to claim 10, further comprising a resin layer which is formed on a face of the permanent magnet facing the sheet-shaped coil.

12. The optical unit with a shake correcting function according to claim 10, wherein a distance between the permanent magnet and the sheet-shaped coil is widened as separated in a direction of the optical axis from a swing center of the movable module.

13. The optical unit with a shake correcting function according to claim 1, wherein
  the plurality of the permanent magnets is four flat plate-shaped permanent magnets which are fixed to four outer faces of a case having a rectangular tube-shaped body part which structures the movable module,
  the sheet-shaped coil is formed with four coil parts which are integrally provided at a certain distance therebetween, and
  the four coil parts are respectively fixed to four inner faces of a cover having a rectangular tube-shaped body part structuring the fixed body.

* * * * *